(No Model.)
J. FAIRMAN.
APPARATUS FOR AERIAL PHOTOGRAPHY.
No. 367,610. Patented Aug. 2, 1887.
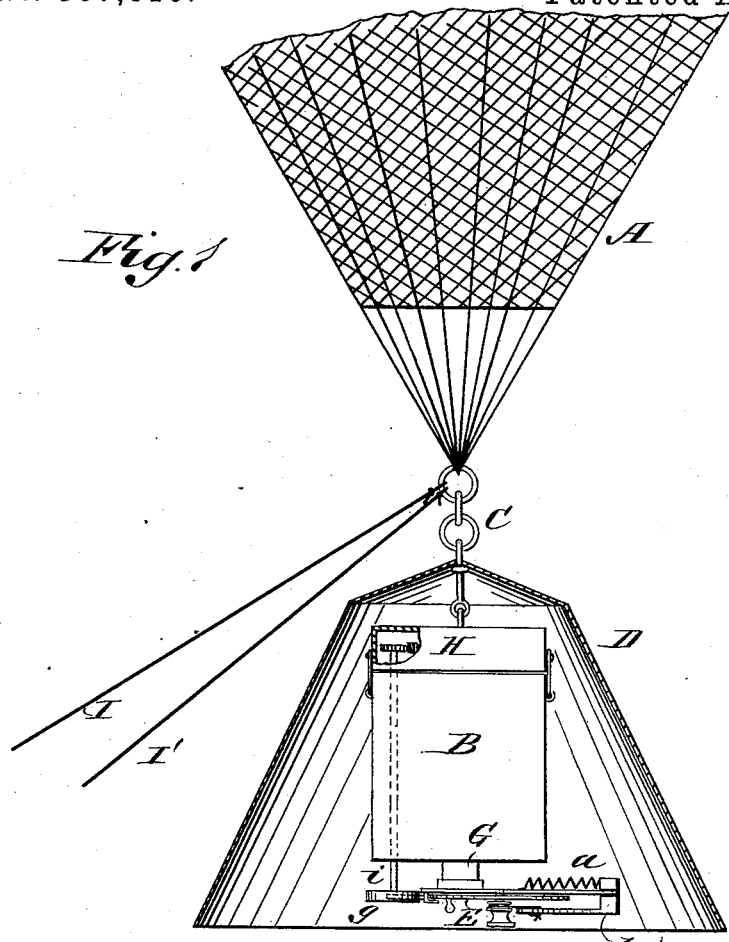
Fig. 1
Fig. 2
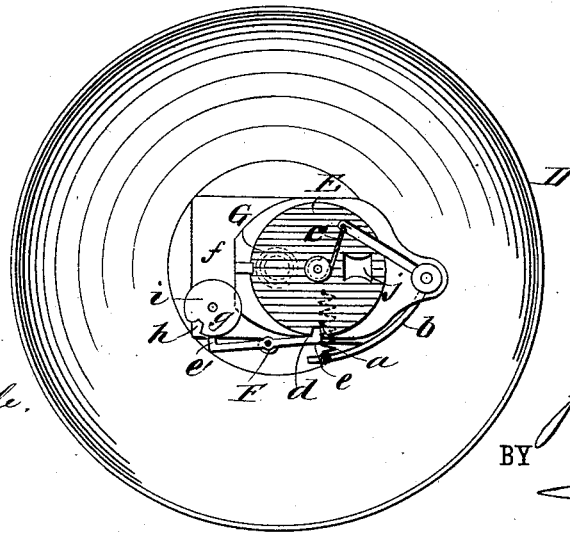
WITNESSES:
F. McArdle.
C. Sedgwick
INVENTOR:
J. Fairman
BY Munn &Co.
ATTORNEYS.

UNITED STATES PATENT OFFICE.

JAMES FAIRMAN, OF NEW YORK, N. Y.

APPARATUS FOR AERIAL PHOTOGRAPHY.

SPECIFICATION forming part of Letters Patent No. 367,610, dated August 2, 1887.

Application filed March 31, 1886. Serial No. 197,314. (No model.)

*To all whom it may concern:*

Be it known that I, JAMES FAIRMAN, of the city, county, and State of New York, have invented a new and useful Improvement in Apparatus for Aerial Photography, of which the following is a specification, reference being had to the annexed drawings, forming a part thereof, in which—

Figure 1 is a side elevation, partly in section, of my improved apparatus for aerial photography. Fig. 2 is an inverted plan view.

Similar letters of reference indicate corresponding parts in both figures of the drawings.

The object of my invention is to provide a method of and apparatus for taking photographic views from a great altitude without the necessity of the presence of an operator.

In carrying out my invention I attach to a balloon, kite, or suitable projectile a photographic camera, with its lens and tube pointing vertically downward, or at any desired angle, and I provide the camera with a shutter actuated by a spring and controlled by clock-movement or other time arrangement, and I inclose the whole in an inverted funnel to insure steadiness during the ascent.

In my specification I shall describe my invention in connection with a balloon as a means of elevating the camera; but I do not limit or confine myself to the employment of a balloon for this purpose.

From the balloon A is suspended the camera B by the chain C, and to the chain C is secured an inverted funnel, D, which incloses the camera on all sides except the bottom, and insures its steadiness while it moves upward through the air. The camera B is provided with a revolving shutter, E, actuated by a spiral spring, $a$, through the medium of the lever $b$ and cord $c$, secured to one arm of the lever and wound around the boss of the shutter E.

In the edge of the shutter is formed a notch, $d$, in which is received the right-angled end $e$ of the two-armed lever F, which is pivoted to a fixed support, $f$, carried on the camera-tube G. The opposite right-angled end, $e'$, of the lever F normally rests upon the periphery of the wheel $g$, having a notch, $h$. The wheel $g$ is mounted on the arbor $i$, which extends upward through the camera-box and is connected with the time-movement H, secured to the upper end of the camera. The arbor $i$ is made to rotate with more or less speed, according to the interval required between the exposures of the plates carried by the camera.

Any gearing or spring-acted movement which is capable of being regulated and has sufficient power to rotate the wheel $g$ may be used for operating the shutter. Therefore I do not describe the gearing or motor in detail. The cord $c$ and spring $a$ are of sufficient length to insure the desired number of rotations of the shutter E during one ascent.

Before the balloon is started on its upward course the shutter-acting mechanism is adjusted with reference to the lever F so that the notch $h$ in the wheel $g$ will receive the right-angled end $e'$ of the lever F when the balloon has reached the elevation at which the exposure of the photographic plate is desired. When the right-angled end $e'$ of the lever F drops into the notch $h$ of the wheel $g$, the rotating shutter E is released from the lever F and makes a single revolution, opening and closing the camera-tube G by the passing of the opening $j$ in front of the tube G.

The sensitive plate or plates carried by the camera may be shifted by the same mechanism that operates the shutter.

The balloon A is held captive by the guy-ropes I I', which also serve to guide it.

In lieu of the gearing I may employ an electro-magnetic shutter-operating device carrying the wires by or through the guy-ropes I I', or the shutter may be released by means of a cord extending to the ground.

A balloon freely suspended in the air is liable to revolve continually with greater or less velocity, and a single guy-rope is insufficient to prevent the turning of the balloon. By the application of two guy-ropes to the suspension of the balloon at one side of the axis thereof the turning of the balloon is prevented, and one of the difficulties of aerial photography is thereby obviated. By the employment of two guy-ropes I am also enabled to locate and hold the balloon in any desired position above the field to be photographed.

Having thus described my invention, what I claim as new, and desire to secure by Letters Patent, is—

1. The combination, with the camera-carrying balloon A, of two guy-ropes, I I', connected with one side of one of the suspension-links of the camera for confining, guiding, and preventing the turning of the balloon and suspended camera, substantially as specified.

2. The combination, with the suspended camera, of a funnel-shaped shield having its apex attached to the suspension chain or link of the camera and extending downward over the camera, partly inclosing the sides and top of the camera, substantially as specified.

3. The combination, with the balloon A, camera B, and conical funnel D, suspended loosely over the camera, of the guy-ropes I I', attached to one side of one of the suspension-rings of the camera for confining and guiding the balloon, substantially as shown and described.

JAMES FAIRMAN.

Witnesses:
SAML. J. JOHNSON,
J. L. KING.